US012208044B2

(12) United States Patent
Kurt et al.

(10) Patent No.: US 12,208,044 B2
(45) Date of Patent: Jan. 28, 2025

(54) PATIENT REPOSITIONING SHEET, SYSTEM, AND METHOD

(71) Applicant: Medline Industries, LP, Northfield, IL (US)

(72) Inventors: Alyssa Kurt, Trevor, WI (US); Morgan Uridil, Evanston, IL (US); Stephen Kaidantsis, Chicago, IL (US); Vincent Hahn, Chicago, IL (US); Drew Phalen, Skokie, IL (US)

(73) Assignee: Medline Industries, LP, Northfield, IL (US)

( * ) Notice: Subject to any disclaimer, the term of this patent is extended or adjusted under 35 U.S.C. 154(b) by 231 days.

(21) Appl. No.: 17/718,643

(22) Filed: Apr. 12, 2022

(65) Prior Publication Data

US 2022/0233379 A1 Jul. 28, 2022

Related U.S. Application Data

(62) Division of application No. 16/570,271, filed on Sep. 13, 2019, now Pat. No. 11,331,235.

(51) Int. Cl.
*A61G 7/10* (2006.01)

(52) U.S. Cl.
CPC ......... *A61G 7/1028* (2013.01); *A61G 7/1021* (2013.01); *A61G 7/1026* (2013.01); *A61G 2200/327* (2013.01)

(58) Field of Classification Search
CPC .. A61G 7/1028; A61G 7/1021; A61G 7/1026; A61G 2200/327; A61G 7/05769; A61G 7/001; A61G 7/05776; A61G 2200/32; A61G 7/05715; A61G 7/0525; A61G 7/05784; A61G 1/01; A61G 2200/16; A61G 7/05792; A61G 7/05753; A47C 27/081; A47C 27/10; A47C 20/048;
(Continued)

(56) References Cited

U.S. PATENT DOCUMENTS 2,587,068 A 2/1952 Sanders
2,880,427 A 4/1959 Atwood
(Continued)

FOREIGN PATENT DOCUMENTS

EP 0913138 5/1999
FR 2974988 A1 * 11/2012 ......... A61G 7/05738
(Continued)

OTHER PUBLICATIONS

Extended European Search Report from related European Patent Application No. 18790700.1 dated Nov. 11, 2020; 6 pages.
(Continued)

*Primary Examiner* — Adam C Ortiz
*Assistant Examiner* — Madison Emanski
(74) *Attorney, Agent, or Firm* — Fitch, Even, Tabin & Flannery LLP

(57) ABSTRACT

In one aspect, the present disclosure provides a patient repositioning sheet including an inflatable sheet having a lower layer and an upper layer that are urged apart with inflation of the inflatable sheet. The patient repositioning sheet further includes at least one inflatable support, such as an inflatable wedge. The inflatable wedge has a wedge surface that extends obliquely to the upper layer of the inflatable sheet with the inflatable wedge inflated.

16 Claims, 6 Drawing Sheets

(58) Field of Classification Search

CPC ............ A47C 27/08; A61B 2562/0247; A61B 2562/0252; A61F 2013/15154

USPC .................... 5/713, 715, 710, 732, 615, 706

See application file for complete search history.

(56) References Cited

U.S. PATENT DOCUMENTS

| | | | |
|---|---|---|---|
| 3,739,407 | A | 6/1973 | Stiller |
| 4,272,856 | A | 6/1981 | Wegener |
| 4,301,791 | A | 11/1981 | Franco, III |
| 4,528,704 | A | 7/1985 | Wegener |
| 4,686,719 | A | 8/1987 | Johnson |
| 4,723,327 | A | 2/1988 | Smith |
| 4,837,872 | A | 6/1989 | DiMatteo |
| D306,148 | S | 2/1990 | Dannals |
| 4,987,623 | A | 1/1991 | Stryker |
| 5,065,464 | A | 11/1991 | Blanchard |
| 5,067,189 | A | 11/1991 | Weedling |
| 5,088,136 | A | 2/1992 | Stryker |
| D329,216 | S | 9/1992 | Beeley |
| 5,442,821 | A | 8/1995 | Weeks |
| RE35,299 | E | 7/1996 | Weedling et al. |
| 5,561,873 | A | 10/1996 | Weedling |
| 5,742,958 | A | 4/1998 | Solazzo |
| 5,860,174 | A | 1/1999 | Failor |
| 5,926,883 | A * | 7/1999 | Rechin .................. A61G 7/001 362/276 |
| 5,960,497 | A | 10/1999 | Castellino |
| 6,073,291 | A | 6/2000 | Davis |
| 6,467,106 | B1 | 10/2002 | Heimbrock |
| 6,701,544 | B2 | 3/2004 | Heimbrock |
| D488,107 | S | 4/2004 | Saunier |
| 6,775,868 | B1 | 8/2004 | Mileti |
| 6,854,137 | B2 | 2/2005 | Johnson |
| 6,898,809 | B2 | 5/2005 | Davis |
| D506,710 | S | 6/2005 | Hurtado |
| 7,028,350 | B1 | 4/2006 | Davis |
| 7,107,641 | B2 | 9/2006 | Davis |
| 7,114,204 | B2 | 10/2006 | Patrick |
| 7,131,154 | B2 | 11/2006 | Davis |
| 7,146,660 | B2 | 12/2006 | Heimbrock |
| 7,168,115 | B2 | 1/2007 | Davis |
| 7,210,176 | B2 | 5/2007 | Weedling |
| 7,243,382 | B2 | 7/2007 | Weedling |
| 7,266,852 | B2 | 9/2007 | Davis |
| 7,337,477 | B2 | 3/2008 | Scordato |
| 7,373,680 | B2 | 5/2008 | Davis |
| 7,376,995 | B2 | 5/2008 | Davis |
| 7,406,723 | B2 | 8/2008 | Davis |
| 7,415,738 | B2 | 8/2008 | Weedling |
| 7,467,431 | B2 | 12/2008 | Weedling |
| 7,487,559 | B1 | 2/2009 | Denosky |
| 7,559,103 | B2 | 7/2009 | Barth |
| 7,565,709 | B2 | 7/2009 | Davis |
| 7,574,761 | B2 | 8/2009 | Davis |
| D602,759 | S | 10/2009 | Davis |
| D602,760 | S | 10/2009 | Davis |
| 7,627,910 | B2 | 12/2009 | Davis |
| 7,650,654 | B2 | 1/2010 | Lambarth |
| D610,491 | S | 2/2010 | Singleton |
| 7,681,262 | B2 | 3/2010 | Weedling |
| 7,712,170 | B2 | 5/2010 | Davis |
| 7,735,164 | B1 | 6/2010 | Patrick |
| 7,739,758 | B2 | 6/2010 | Weedling |
| 7,849,533 | B1 | 12/2010 | Receveur |
| 7,861,335 | B2 | 1/2011 | DeLuca |
| 7,900,299 | B2 | 3/2011 | Weedling |
| 7,954,186 | B2 | 6/2011 | Flick |
| 7,975,330 | B2 | 7/2011 | Receveur |
| 8,006,333 | B2 | 8/2011 | Genaro |
| D644,913 | S | 9/2011 | Davis |
| 8,011,039 | B2 | 9/2011 | Stryker |
| 8,201,292 | B2 | 6/2012 | Dionne |
| 8,234,727 | B2 | 8/2012 | Schreiber |
| 8,276,222 | B1 | 10/2012 | Patrick |
| 8,296,887 | B2 | 10/2012 | Doehler |
| 8,302,222 | B2 | 11/2012 | Jasani |
| 8,387,177 | B2 | 3/2013 | Davis |
| 8,397,326 | B2 | 3/2013 | Lafleche |
| 8,413,277 | B2 | 4/2013 | Davis |
| D690,424 | S | 9/2013 | Ponsi |
| 8,566,977 | B2 | 10/2013 | Davis |
| 8,656,529 | B2 | 2/2014 | Corriveau |
| 8,701,225 | B1 | 4/2014 | Latiff |
| 8,756,725 | B2 | 6/2014 | Piegdon |
| 8,776,290 | B2 | 7/2014 | Wilkinson |
| 8,782,826 | B2 | 7/2014 | White |
| 8,789,533 | B2 | 7/2014 | Steffens |
| 8,832,885 | B2 | 9/2014 | Lafleche |
| 8,850,634 | B2 | 10/2014 | Ponsi |
| 8,856,992 | B2 | 10/2014 | Lafleche |
| 8,887,326 | B2 | 11/2014 | Patrick |
| 8,910,325 | B2 | 12/2014 | Faucher |
| 8,911,387 | B2 | 12/2014 | Lafleche |
| 8,984,681 | B2 | 3/2015 | Ponsi |
| 9,101,521 | B2 | 8/2015 | White |
| 9,114,050 | B2 | 8/2015 | White |
| 9,125,777 | B2 | 9/2015 | Patrick |
| 9,132,052 | B2 | 9/2015 | Fowler |
| 9,156,656 | B2 | 10/2015 | Rosenthal |
| 9,222,498 | B2 | 12/2015 | Faucher |
| 9,241,580 | B2 | 1/2016 | Patrick |
| 9,278,038 | B2 | 3/2016 | Masucci |
| 9,314,388 | B2 | 4/2016 | Patrick |
| 9,414,977 | B2 | 8/2016 | Ponsi |
| 9,421,140 | B2 | 8/2016 | Faucher |
| 9,427,367 | B2 | 8/2016 | White |
| 9,456,944 | B2 | 10/2016 | Berg |
| 9,526,348 | B2 | 12/2016 | Richards |
| 9,596,946 | B2 | 3/2017 | Scarleski |
| 9,615,983 | B2 | 4/2017 | Stryker |
| 9,668,929 | B2 | 6/2017 | Patterson |
| 9,693,919 | B2 | 7/2017 | Berman |
| 9,693,920 | B2 | 7/2017 | Fowler |
| 9,693,921 | B2 | 7/2017 | Koger |
| 9,782,312 | B2 | 10/2017 | Brubaker |
| D803,894 | S | 11/2017 | Kennedy |
| 9,820,902 | B2 | 11/2017 | Pons |
| 9,820,903 | B2 | 11/2017 | Steffens |
| 9,820,904 | B2 | 11/2017 | Lafleche |
| 9,839,565 | B1 | 12/2017 | Harris |
| 9,849,053 | B2 | 12/2017 | Rigoni |
| 9,861,544 | B2 | 1/2018 | Rigoni |
| 9,877,884 | B2 | 1/2018 | Berg |
| D817,362 | S | 5/2018 | Kennedy |
| D826,991 | S | 8/2018 | Kennedy |
| 10,039,680 | B2 | 8/2018 | Galbraith |
| 10,064,773 | B2 | 9/2018 | Rigoni |
| D830,415 | S | 10/2018 | Kennedy |
| D831,074 | S | 10/2018 | Ecklund |
| 10,092,470 | B2 | 10/2018 | Lewis |
| 10,117,800 | B1 | 11/2018 | Galbraith |
| 10,123,630 | B2 | 11/2018 | Scarleski |
| D837,264 | S | 1/2019 | Kennedy |
| 10,182,956 | B2 | 1/2019 | Stryker |
| 10,244,994 | B2 | 4/2019 | Davis |
| 10,285,888 | B2 | 5/2019 | Liu |
| 10,327,562 | B2 | 6/2019 | Scarleski |
| 10,376,430 | B2 | 8/2019 | Liu |
| 10,398,614 | B2 | 9/2019 | Rigoni |
| 10,543,138 | B2 | 1/2020 | Shih |
| 10,561,556 | B2 | 2/2020 | Rigoni |
| 10,561,557 | B2 | 2/2020 | Emerson |
| 10,588,800 | B2 | 3/2020 | Fletcher |
| 10,624,806 | B2 | 4/2020 | Emerson |
| 10,632,575 | B2 | 4/2020 | Kennedy |
| 10,765,576 | B2 | 9/2020 | Rigoni |
| 10,772,778 | B2 | 9/2020 | Hahn |
| 10,828,216 | B2 | 11/2020 | Phalen |
| 10,836,002 | B2 | 11/2020 | Kennedy |
| 2002/0166168 | A1 | 11/2002 | Weedling |
| 2005/0028273 | A1 | 2/2005 | Weedling |
| 2005/0034242 | A1 | 2/2005 | Davis |
| 2005/0076437 | A1 | 4/2005 | Johnson |

(56) References Cited

U.S. PATENT DOCUMENTS

2006/0000016 A1 1/2006 Weedling
2006/0021133 A1 2/2006 Davis
2006/0031990 A1 2/2006 Palmatier
2006/0282946 A1 12/2006 Meyer
2007/0006388 A1 1/2007 Townsend
2007/0240260 A1 10/2007 White
2007/0266494 A1 11/2007 DeLuca
2008/0000028 A1 1/2008 Lemire
2008/0028516 A1 2/2008 Morishima
2008/0120780 A1 5/2008 Genaro
2008/0141463 A1 6/2008 Dionne
2008/0209630 A1 9/2008 Kazala
2008/0263763 A1* 10/2008 Butler ................ A61G 7/05715 5/81.1 R
2008/0289102 A1 11/2008 Davis
2010/0071137 A1* 3/2010 Doehler ............. A61G 7/05715 5/713
2010/0229298 A1 9/2010 Davis
2010/0287698 A1 11/2010 Stryker
2011/0056017 A1 3/2011 Schreiber
2011/0072579 A1 3/2011 Receveur
2011/0092890 A1 4/2011 Stryker
2011/0289691 A1 12/2011 Lafleche
2011/0296623 A1 12/2011 Lafleche
2011/0296624 A1 12/2011 Lafleche
2011/0301516 A1 12/2011 Lafleche
2012/0186012 A1 7/2012 Ponsi
2012/0186013 A1 7/2012 Ponsi
2012/0186587 A1 7/2012 Steffens
2012/0210511 A1 8/2012 Davis
2013/0042414 A1 2/2013 Schreiber
2013/0061396 A1 3/2013 Lafleche
2013/0205495 A1 8/2013 Ponsi
2013/0219628 A1 8/2013 Blanchard
2013/0227787 A1 9/2013 Herbst
2013/0318708 A1 12/2013 Wang
2014/0007353 A1 1/2014 Stryker
2014/0041114 A1 2/2014 Davis
2014/0059780 A1 3/2014 Lafleche
2014/0259400 A1 9/2014 Stryker
2014/0304918 A1 10/2014 Steffens
2015/0000045 A1 1/2015 Lafleche
2015/0040326 A1* 2/2015 Fairburn ............ A61G 7/05792 5/713
2015/0047121 A1 2/2015 Berg
2015/0074903 A1 3/2015 Berg
2015/0101126 A1* 4/2015 Reiners ................ A61G 7/1023 5/715
2015/0143628 A1 5/2015 Fowler
2015/0342811 A1 12/2015 Wong
2016/0008194 A1 1/2016 Ponsi
2016/0095777 A1 4/2016 Berman
2016/0331611 A1 11/2016 Ponsi
2016/0367422 A1 12/2016 Weedling
2016/0374883 A1 12/2016 Galbraith
2017/0049646 A1 2/2017 Rigoni
2017/0049647 A1 2/2017 Rigoni
2017/0065476 A1 3/2017 Berg
2017/0119608 A1 5/2017 Rigoni
2017/0143565 A1 5/2017 Childs
2017/0151112 A1 6/2017 Fletcher
2017/0172827 A1 6/2017 Schaaf
2017/0216117 A1 8/2017 Rigoni
2017/0296414 A1 10/2017 Fowler
2017/0326011 A1 11/2017 Alvarez
2018/0049935 A1 2/2018 Rigoni
2018/0071158 A1 3/2018 Lafleche
2018/0200130 A1 7/2018 Liu
2018/0250180 A1* 9/2018 Phalen ................. A61G 7/1026
2018/0303690 A1 10/2018 Hahn
2018/0318162 A1 11/2018 Galbraith
2018/0353360 A1 12/2018 Kea
2018/0369048 A1 12/2018 Rigoni et al.
2018/0369050 A1 12/2018 Davis
2019/0083341 A1 3/2019 Ulreich
2019/0091085 A1 3/2019 Emerson
2019/0091086 A1 3/2019 Emerson
2019/0091088 A1 3/2019 Emerson
2019/0201261 A1* 7/2019 Galer ................. A61G 7/05769
2019/0201262 A1 7/2019 Galer
2019/0216663 A1 7/2019 Ulreich
2019/0231624 A1 8/2019 Lafleche
2019/0380899 A1 12/2019 Rigoni
2020/0022859 A1 1/2020 Werkheiser
2020/0060912 A1 2/2020 Hollabaugh
2020/0078243 A1 3/2020 Berg
2020/0129355 A1 4/2020 Emerson
2020/0138656 A1 5/2020 Davis
2020/0146913 A1 5/2020 Davis
2020/0179203 A1 6/2020 Rigoni
2020/0315886 A1 10/2020 Dudonis
2020/0397634 A1 12/2020 Rigoni
2021/0077325 A1 3/2021 Davis
2021/0093493 A1 4/2021 Davis
2021/0121347 A1 4/2021 Davis
2021/0154069 A1 5/2021 Davis
2021/0186780 A1 6/2021 Davis
2021/0244592 A1 8/2021 Davis

FOREIGN PATENT DOCUMENTS

WO 2012103232 A2 8/2012
WO 2012170934 A2 12/2012
WO WO-2013166003 A1 * 11/2013 ............. A61G 7/001
WO WO-2019036458 A1 * 2/2019 ............. A61G 7/001

OTHER PUBLICATIONS

Frontier Medical Group, "Automated Patient Turning Repositioned," (2018), 3 pages.
Image of ArjoHuntleigh's Repositioning Sheet, date unknown.
Images from Prevalon™ AirTAP System™ Demo, product video at https://www.youtube.com/watch?v=BtEaFrElfcU; Sage Products LLC; published on Aug. 9, 2016, 10 pages.
Images of Handicare's SystemRoMedic™—SafeHandlingSheet, date unknown.
PCT Search Report and Written Opinion from International Application No. PCT/US2018/017948 dated Jun. 27, 2018; 15 pages.
PCT Search Report and Written Opinion from International Patent Application No. PCT/US2018/025871 dated Aug. 13, 2018; 12 pages.
Transcription of and images from Prevalon® Turn & Position System product video at https://www.youtube.com/watch?v=VT82CV1couA; Sage Products LLC published on Dec. 10, 2013, 33 pages.
Transcription of and images of AirPal Air-Assisted Lateral Patient Transfer, product demo at https://www.youtube.com/watch?v=I7K5s_9Cr2c; AirPal, Inc.; published on May 1, 2014, 36 pages.
Transcription of and images of Comfort Glide™ Patient Repositioning System, product video at https://vimeo.com/90363103; Medline Industries, Inc.; publicly available at least as of Mar. 2014, 51 pages.
Transcription of and images of HoverMatt® Air Transfer System, product video at https://www.youtube.com/watch?v=8x6XmF5hgyg; CJ Medical; published on Oct. 15, 2014, 7 pages.

* cited by examiner

PATIENT REPOSITIONING SHEET, SYSTEM, AND METHOD

CROSS REFERENCE TO RELATED APPLICATION

This application is a division of U.S. application Ser. No. 16/570,271 filed Sep. 13, 2019, which is hereby incorporated by reference in its entirety.

FIELD

This disclosure relates to patient transfer devices and, more specifically, to inflatable patient transfer sheets.

BACKGROUND

Inflatable patient transfer sheets are used to transfer patients from one surface to another, such as from a hospital bed to a gurney. Inflatable patient transfer sheets often include an interior volume that is filled with air via a pump. Inflating the patient transfer sheet increases the area that the patient's weight is distributed across, which makes it easier to move the patient. Inflatable patient transfer sheets may also include a series of holes in a bottom surface of the inflatable transfer sheet that permit air to flow downwardly against an underlying surface such as a hospital bed. The air creates an air bearing between the inflatable patient transfer sheet and further reduces resistance to movement of the patient.

Comatose patients or patients with limited movement may need to be turned periodically to limit the development of pressure ulcers on the patient's skin. Foam wedges are often used to lift one side of a patient to relieve pressure on the patient's skin. To position a foam wedge under a side of a patient, the patient may be log rolled in a first direction to elevate the one side of the patient off of a hospital bed, the foam wedge positioned beneath the patient, and the patient log rolled in a second direction opposite the first direction to position the one side of the patient on the foam wedge. A second log rolling process is subsequently performed to remove the foam wedge from under the patient and a third log rolling process is performed to position the foam wedge under the other side of the patient.

The repeated log rolling of the patient and placement/removal of the foam wedges are labor intensive processes, especially for heavier patients. Further, a patient supported by a foam wedge may need to be transferred to a gurney or another surface, which requires the foam wedge to be removed and an inflatable transfer sheet to be positioned beneath the patient. The inflatable transfer sheet may be positioned under the patient using another log rolling procedure that involves positioning part of a folded inflatable sheet beneath the patient once the patient has been log rolled onto one side, log rolling the patient in an opposite direction to position the patient's other side on the folded inflatable sheet, unfolding the inflatable sheet beneath the patient, then log rolling the patient's back onto the unfolded inflatable sheet. The sheet may then be inflated and pulled and/or pushed to shift the inflatable sheet and patient thereon to another surface. The process of positioning the patient on an inflatable sheet is further manual labor that complicates patient care.

DETAILED DESCRIPTION

Figure 1:
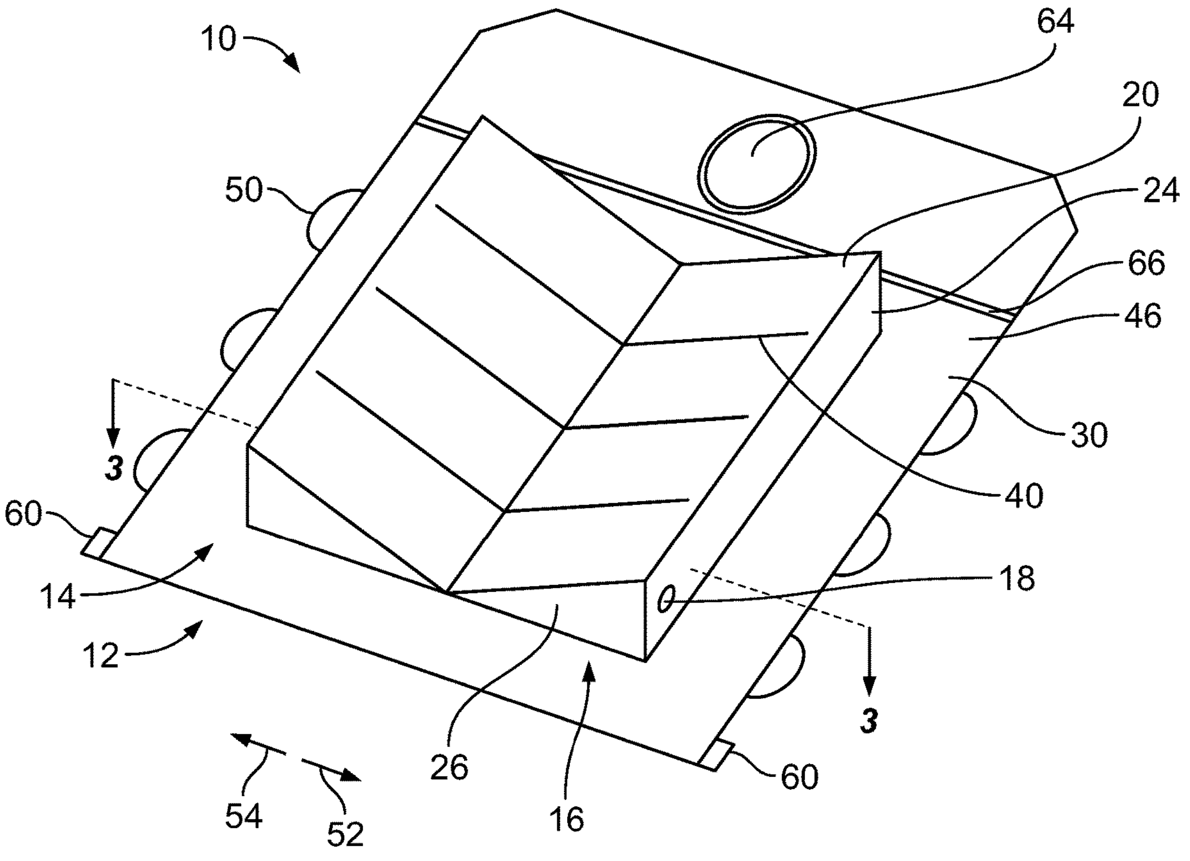
FIG. 1 is a perspective view of a patient repositioning sheet including an inflatable sheet and a pair of inflatable wedges of the inflatable sheet.

Regarding FIG. 1, an inflatable patient repositioning sheet 10 is provided that includes an inflatable sheet 12 and one or more inflatable supports, such as inflatable wedges 14, 16. The inflatable wedges 14, 16 each have one or more wedge air inlets 18 that may be connected to a hose of an air pump to receive air from the pump and inflate the respective wedge 14, 16. The wedges 14, 16 may be inflated one at a time to elevate a respective portion of the patient and relieve pressure on the skin of the patient. The inflatable wedges 14, 16 may be deflated by disconnecting the tube of the pump from the wedge air inlet 18 and permitting the air to escape either through the wedge air inlet 18 or through an upper wall 20 of the inflatable wedges 14, 16. The upper wall 20 may be made of a breathable, air permeable material which improves the feel of the upper wall 20 against a patient. For example, the upper wall 20 may be made of a nylon material having a water vapor transmission rate in the range of 23-440 $g/m^2$ per day as determined by the ASTM E96/E96M testing standard.

Figure 2:
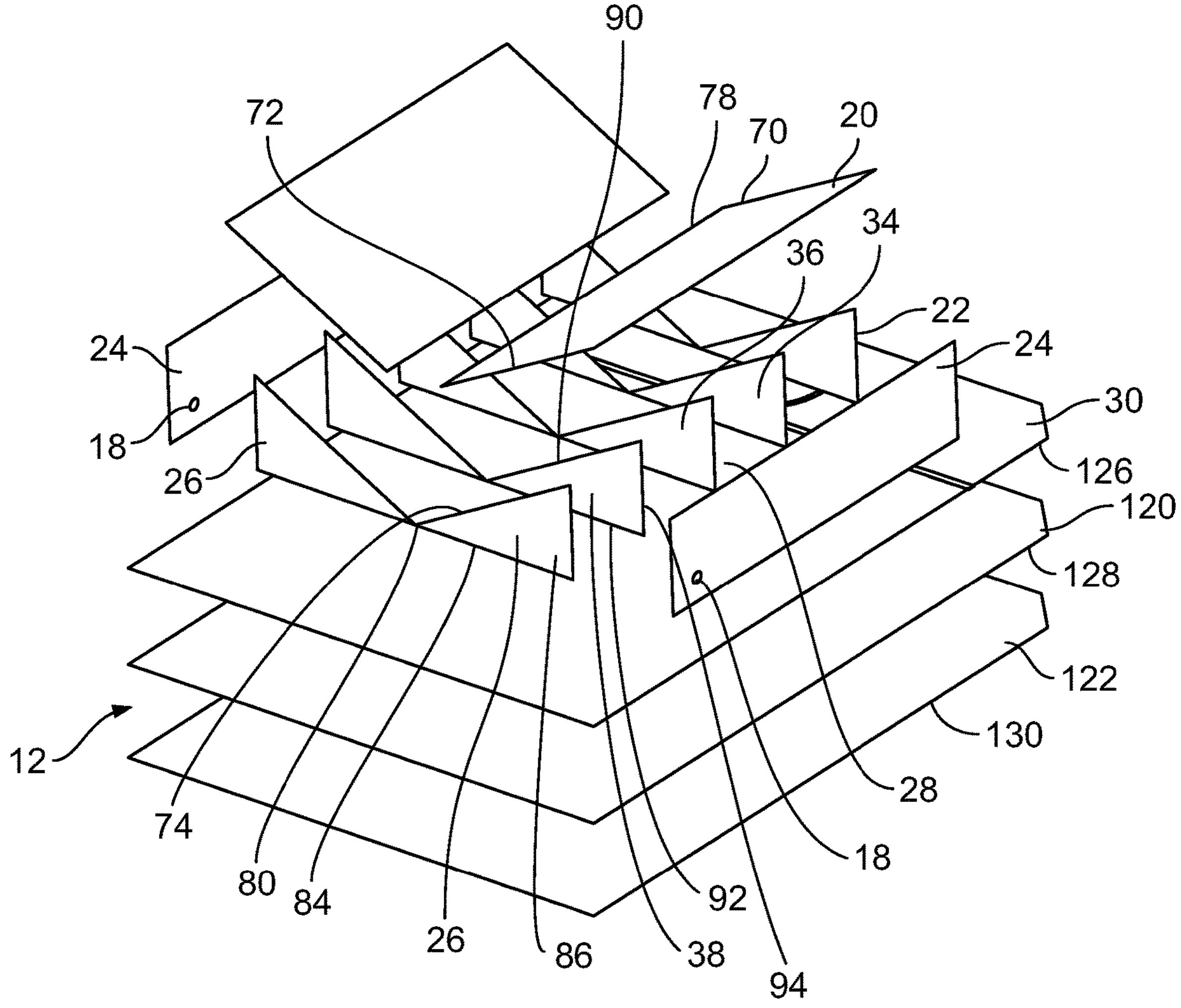
FIG. 2 is an exploded view of a portion of the patient repositioning sheet of FIG. 1.

Regarding FIG. 2, each inflatable wedge 14, 16 includes one or more walls, such as the upper wall 20, an end wall 22, a side wall 24, an end wall 26, and a portion 28 of an uppermost layer, such as a cover layer 30, of the inflatable patient repositioning sheet 10. The inflatable patient repositioning sheet 10 includes an upper patient support layer, such as upper layer 120, and a lower base layer, such as a lower layer 122. The upper layer 120 and lower layer 122 define an interior volume therebetween that receives air from an air pump at one or more sheet air inlets 60. The layers 30, 120, 122 may each be made of nylon as an example. The layer 30 may be made of a microfiber material.

The one or more walls of the inflatable wedge 14, 16 define an interior volume 35 (see FIG. 3) of the inflatable wedge 14, 16 that is in communication with the respective wedge air inlet 18. The wedge air inlet 18 may include or may have connected thereto a one-way valve that permits air to enter the inflatable wedge 14, 16 but prevents air exiting the inflatable wedge 14, 16 via the wedge air inlet 18. The air wedge inlet 18 may be directly in communication with the interior volume of the inflatable wedge 14, 16 such as if the air wedge inlet 18 is formed in the side wall 24. In another embodiment, the air wedge inlet 18 is indirectly in communication with the interior volume 35 of the inflatable wedge 14, 16 and remote from the associated wedge 14, 16. For example, the air wedge inlet 18 may be located near the sheet air inlet 60 and the inflatable patient repositioning sheet 10 includes a channel defined between the cover layer 30 and the upper layer 120 that communicates air from the remote air wedge inlet 18 to the interior volume 35 of the associated inflatable wedge 14, 16. In one embodiment, the interior volumes 35 of the inflatable wedges 14, 16 are not in communication with the interior volume of the inflatable sheet 12 defined between the upper layer 120 and the lower layer 122. The inflatable sheet 12 and inflatable wedges 14, 16 may each be independently inflated or deflated without inflating or deflating the others.

Regarding FIGS. 1 and 2, each inflatable wedge 14, 16 includes one or more internal baffles, such as baffles 34, 36, 38. The baffles 34, 36, 38 and walls 22, 24, 26 may me made of an air impermeable material, such as polyurethane. In another embodiment, the walls 22, 24, 26 may be made of a material that is air-permeable, but with an air-permeability less than the air permeability of the upper wall 20. The air permeability of the walls 20, 22, 24, 26 may be selected to control the deflation rate of the wedge 14, 16.

The baffles 34, 36, 38 are connected to the upper wall 20 via joints 40, such as seams, and are connected to the portion 28 of the cover layer 30 at joints 44. The joints 40, 44 may be formed using heat welds, ultrasonic welds, fusible tape, fusible thread, and/or adhesive as some examples. Fusible thread may be used to stitch fabrics together and melted using heat to fuse the fabrics together The joints between the various components of the inflatable wedges 14, 16 may be airtight such that the only way air may exit the inflatable wedges 14, 16 after inflation of the inflatable wedges 14, 16 is through the upper wall 20 of the inflatable wedges 14, 16. In one embodiment, the material of the wedges 14, 16 are selected so that the inflatable wedges 14, 16 will remain inflated for at least a predetermined time, such as two hours, after the air pump is turned off or disconnected from the inflatable wedges 14, 16. In another embodiment, the associated pump runs continuously or intermittently for the period of time the inflatable wedges 14, 16 are employed to keep the inflatable wedges 14, 16 inflated.

Upon inflation of the inflatable wedges 14, 16, the baffles 34, 36, 38 are placed in tension and resist ballooning of the upper wall 20 to maintain the shape of the inflatable wedge 14, 16. Further, the end walls 22, 26 and side wall 24 are also placed in tension upon inflation of the inflatable wedges 14, 16 and resist inflation of the wedges 14, 16 beyond the intended wedge shape. The baffles 34, 36, 38 also help to distribute the flow of air within the wedge 14, 16 so the air is not focused entirely at the center of the upper wall 20 to limit ballooning. The baffles 34, 36, 38 also distribute the flow of air so that the air is not focused at the edge seams of the wedge 14, 16 to limit tears and leaks at the edge seams.

In one embodiment, the inflatable wedges 14, 16 each position a surface portion of the upper wall 20 thereof at an angle of approximately 30 degrees relative to an adjacent portion of an upper surface 46 of the cover layer 30 upon inflation of the wedges 14, 16. The phrase approximately 30 degrees is intended to encompass exactly 30 degrees as well as some variation customary to patient positioning wedges, such as plus or minus five degrees.

Regarding FIG. 1, the inflatable sheet 12 includes one or more handles 50 that may be grasped and used to push or pull the inflatable patient repositioning sheet 10 in directions 52, 54. The inflatable sheet 12 further includes one or more air inlets 60 which may take a variety of forms such as the sheet air inlet 62 shown in FIG. 4 and discussed in greater detail below. The inflatable sheet 12 may also include a head-receiving portion 64 and an indicator line 66. The indicator line 66 indicates the position of an upper edge of an absorbent incontinence pad that may be placed on the cover layer 30.

Regarding FIG. 2, a portion of the inflatable patient repositioning sheet 10 is shown in an exploded view. The upper wall 20 includes end edges 70, 72 that are joined to upper edges 74 of the end walls 22, 26. A center edge 78 may be joined to a tip 80 of the end walls 22, 26 and to the cover layer 30. The end walls 22, 26 each include a lower edge 84 joined to the cover layer 30 and a side edge 86 joined to the side wall 24. The baffles 34, 36, 38 include upper edges 90 that are joined to the upper wall 20 at the joints 40, lower edges 92 that are joined to the cover layer 30, and side edges 94 that are spaced from the side wall 24.

Figure 3:
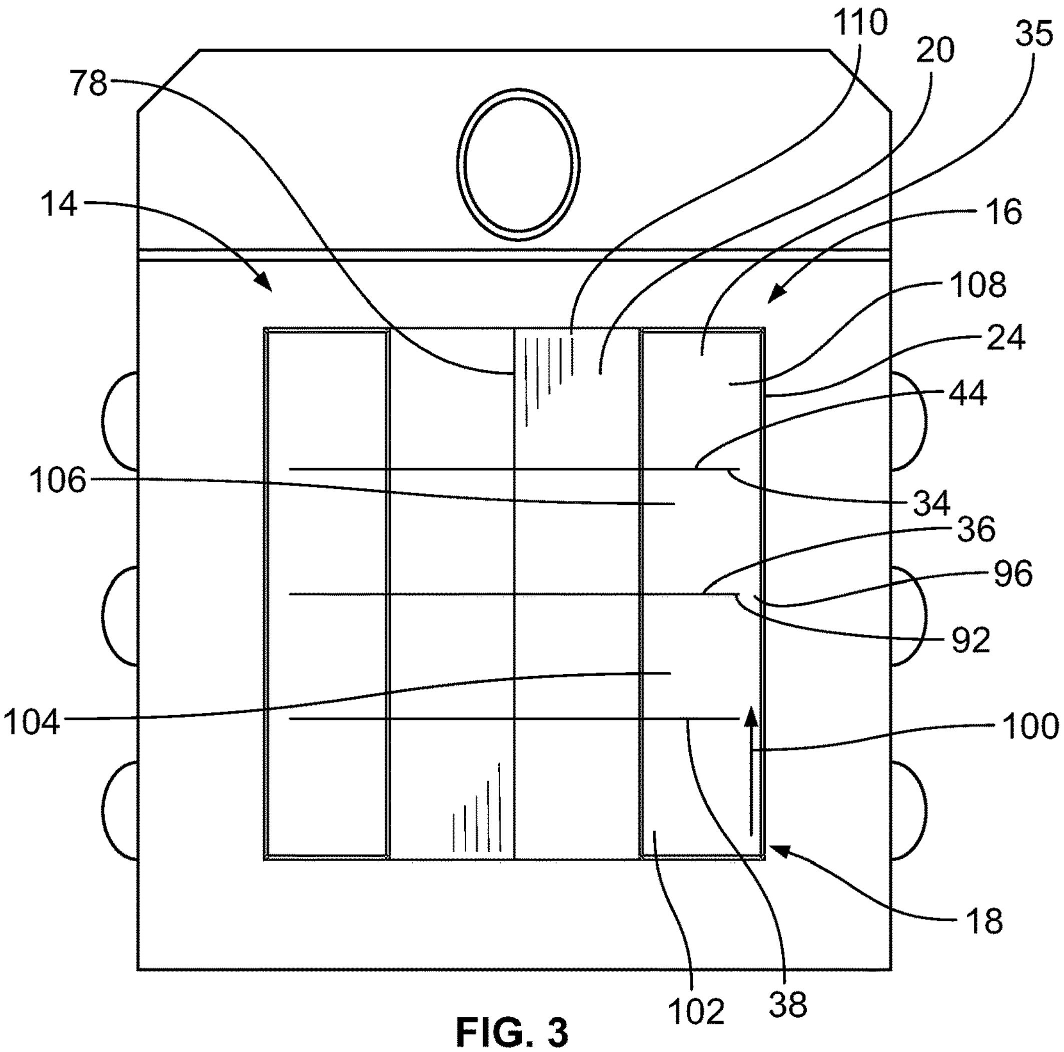
FIG. 3 is a cross-sectional view taken across line 3-3 in FIG. 1 halfway up along the inflatable wedges, showing internal baffles of the inflatable wedges separating chambers of the inflatable wedges.

Regarding FIG. 3, each inflatable wedge 14, 16 includes one or more chambers, such as chambers 102, 104, 106, 108 separated by the baffles 34, 36, 38. The side edges 92 of the baffles 34, 36, 38 are separated by a gap 96 from the side wall 24. The gaps 96 permit air that enters the inflatable wedge 14, 16 via the wedge air inlet 18 to travel in direction 100 from the chamber 102 to the chambers 104, 106, 108 and fill the inflatable wedge 16. In FIG. 3, the cross-section is taken approximately halfway up the wedges 14, 16 to show the upper wall 20 and an upper, patient-supporting surface 110 thereof extending away from the center edge 78 of the upper wall 20 toward the side wall 24. In one approach, the center edges 78 of the upper walls 20 of both inflatable wedges 14, 16 are joined to the cover layer 30 with a single joint that runs along the length of the upper walls 30.

Returning to FIG. 2, the upper layer 120 and the lower layer 122 may be urged apart by supplying air to the sheet air inlet 60 of the inflatable sheet 12. The cover layer 30 has a laminated configuration with the upper layer 120 and such that the cover layer 30 and inflatable wedges 14, 16 thereon move with the upper layer 120 away from the lower layer 122 as air is provided to the sheet air inlet 60. The cover layer 30, upper layer 120, and lower layer 122 have peripheral edges 126, 128, 130 that may be joined together, such as by heat welding, ultrasonic welding, and/or adhesive as some examples.

Figure 4:
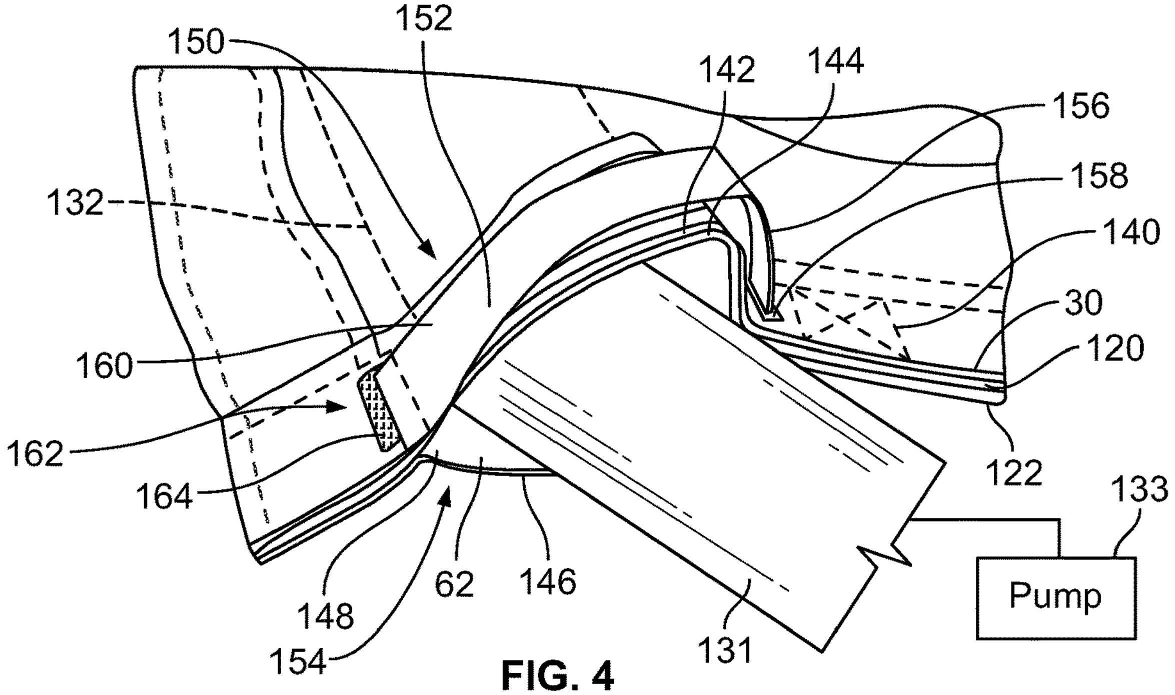
FIG. 4 is a perspective view of an example air inlet of the patient repositioning sheet of FIG. 1.

Regarding FIG. 4, the sheet air inlet 62 is configured to receive an outlet tube 131 of an air pump 133. The inflatable sheet 12 may include an internal tubular sock 132 that receives air from the tube 131 and distributes air across the width of the inflatable sheet 12. In FIG. 4, the cover layer 30, upper layer 120, and lower layer 122 are shown joined around the peripheral edges 126, 128, 130 via stitching 140. The cover layer 30 and upper layer 120 have portions 142, 144 joined together that may be separated from a portion 146 of the lower layer 122 to define an opening 148 between the portions 144, 146 that permits the tube 131 to be placed in communication with the tubular sock 135. In one embodiment, the sheet air inlet 62 includes an adjustable closure 150 that has a closure member, such as a strap 152, with an anchor portion 154 secured to the lower layer 122, an intermediate portion 156 that extends through an opening 158 in the cover layer 30 and upper layer 120, and an end portion 160 that is outside of the cover layer 30 and upper layer 120. The adjustable closure 150 may include a hook and loop closure 162 of the end portion 160 and the cover layer 30. The hook and loop closure 162 include loops 164 on the cover layer 30 that engage hooks on the underside of the end portion 160 of the strap 152. A user may constrict the adjustable closure 150 about the tube 131 by pulling the end portion 160 upward away from the opening 158 in the cover layer 30 and upper layer 120. The user then pivots the end portion 160 downward against the loops 164 to engage the hook and loop closure 162 and maintain the adjustable closure 150 in a constricted configuration about the tube 131. The constricted adjustable closure 150 restricts air escaping via the sheet air inlet 62 as air discharges from the tube 131 into the inflatable sheet 12.

In one embodiment, the wedge air inlets 18 of the inflatable wedges 14, 16 may be similar to the sheet air inlet 62 of FIG. 4. For example, the wedge air inlets 18 may include an opening for receiving an air supply tube (e.g., tube 131) and an adjustable closure 150 to constrict the opening about the air supply tube. In this manner, the same pump 133 and air supply tube 131 may be used to inflate any of the inflatable sheet 12, inflatable wedge 14, and inflatable wedge 16 as desired by a user. Further, in one embodiment, the internal volumes of the inflatable sheet 12 and inflatable wedges 14, 16 are not in communication with each other such that the pump 133 may be used to independently inflate any one of the inflatable sheet 12, inflatable wedge 14, and inflatable wedge 16.

The inflatable supports of the inflatable patient repositioning sheet 10 may have shapes other than the wedges 14, 16. For example, the inflatable supports may include rectangular, dome-shaped, and half-cylindrical inflatable supports as some examples.

Figure 5:
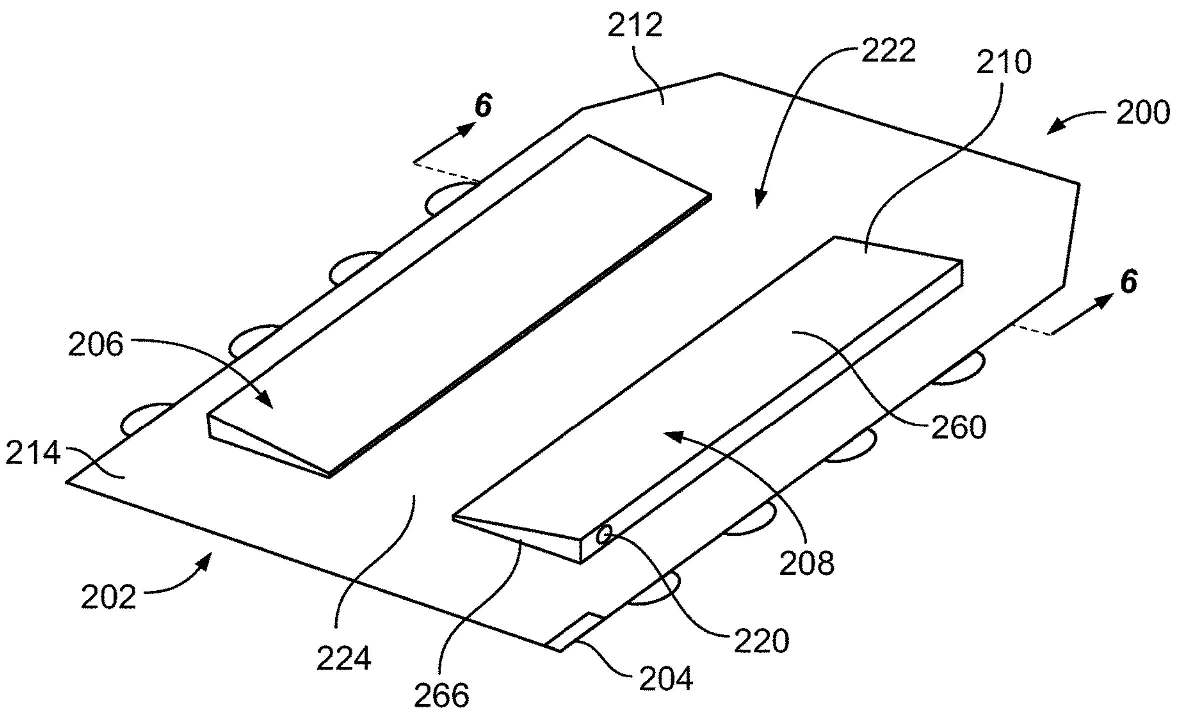
FIG. 5 is a perspective view of another patient repositioning sheet including an inflatable sheet and a pair of inflatable wedges of the inflatable sheet.

Regarding FIG. 5, an inflatable patient repositioning sheet 200 is provided that is similar in many respects to the inflatable patient repositioning sheet 10 discussed above such that differences will be highlighted. The inflatable patient repositioning sheet 200 includes an inflatable sheet 202 having one or more sheet air inlets 204 and one or more inflatable wedges, such as inflatable wedges 206, 208. In FIG. 5, one inflatable wedge 206, 208 is provided on each side of the inflatable sheet 202. The inflatable wedges 206, 208 are elongated and extend for a majority of the length of the inflatable patient repositioning sheet 200, such as more than 55 percent, more than 60 percent, more than 70 percent, more than 80 percent, or more than 90 percent of the length of the inflatable patient repositioning sheet 200. The lengths of the inflatable wedges 206, 208 permit the inflatable wedges 206, 208 to reposition patients of varying heights because the supported portion of the patient, such as a patient's hip, may be positioned anywhere along the inflatable wedges 206, 208. In other embodiments, there may be two or more inflatable wedges positioned on each side of the inflatable sheet 202.

With reference to FIG. 5, the inflatable wedges 206, 208 each include an upper wall 210 that may be inclined relative to an upper surface 212 of a cover layer 214, such as at an angle of approximately 30 degrees, when the inflatable wedge 206, 208 is inflated. The inflatable wedges 206, 208 each include one or more wedge air inlets 220 that may receive air from a pump. The inflatable patient repositioning sheet 200 includes a gap 222 between the inflatable wedges 206, 208. In one embodiment, the inflatable wedges 206, 208 are separated by a surface portion 224 of the cover layer 214.

Figure 6:
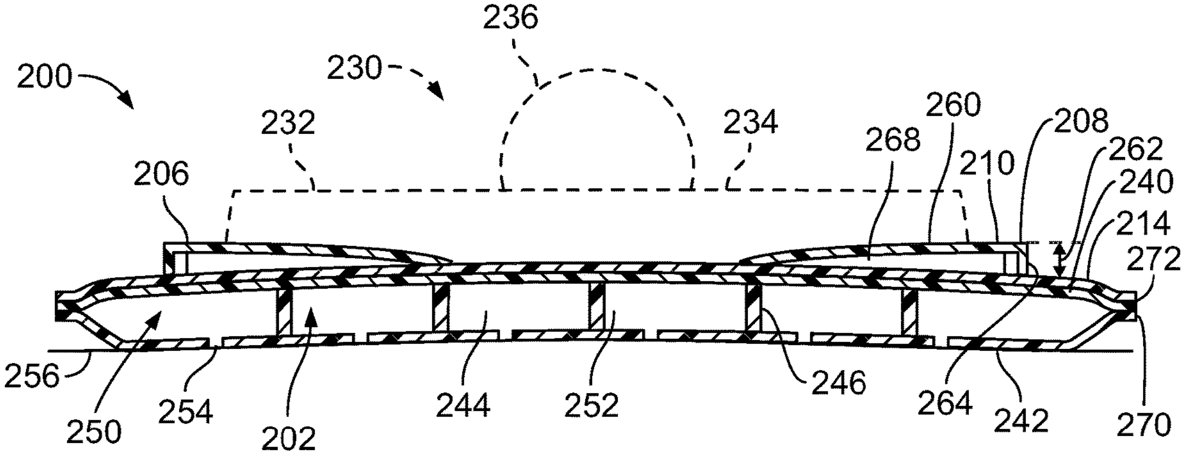
FIG. 6 is a cross-sectional view taken across line 6-6 in FIG. 5 showing the inflatable wedges and the inflatable sheet of the inflatable patient repositioning sheet of FIG. 5 in an initial, deflated configuration.

Regarding FIG. 6, the inflatable patient repositioning sheet 200 is shown in an initial, deflated configuration. The term deflated is used to refer to a state of inflation less than fully inflated. In FIG. 6, a patient 230 is shown in a supine position having a side 232 supported on the wedge 206, a side 234 supported on the inflatable wedge 208, and a head 236 supported on the upper surface 212 of the cover layer 214 (such as on a pillow). In one embodiment, the cover layer 214 is made of a high-friction material so that the upper surface 212 resists movement of the patient on the cover layer 214. For example, the cover layer 214 may be made of a microfiber material.

Regarding FIG. 6, the inflatable patient repositioning sheet 202 includes an upper layer 240 to which the cover layer 214 is secured and a lower layer 242 separated by an air gap 244 from the upper layer 240. The air gap 244 may be small or nonexistent when the inflatable patient repositioning sheet 202 is deflated. The inflatable sheet 202 may include one or more baffles 246 that divide an interior volume 250 of the inflatable sheet 202 into two or more chambers 252. The lower layer 242 may include a plurality of exit holes 254 that permit air pumped into the interior volume 250 to travel downward against a support surface 256 and create an air bearing therebetween the lower layer 242 and the surface 256.

In FIG. 6, each inflatable wedge 206, 208 has an upper wall 210 and a surface portion, such as an upper, patient supporting surface 260, at an angle 262. The inflatable wedges 206, 208 are shown in an initial deflated configuration, which may be partially or completely deflated, such that the angle 262 may be less than 20 degrees, such as less than 10 degrees, such as less than 5 degrees. The angle 262 may be generally limited by the material of the upper wall 210, a side wall 264, end walls 266 (see FIG. 5), and baffles 268 of the inflatable wedges 206, 208. Further, the cover layer 214, upper layer 240, and lower layer 242 may be joined at peripheral edges 270 thereof at a joint 272. The joint 272 may be formed using, for example, heat welding, ultrasonic welding, adhesive, and/or other approaches.

Figure 7:
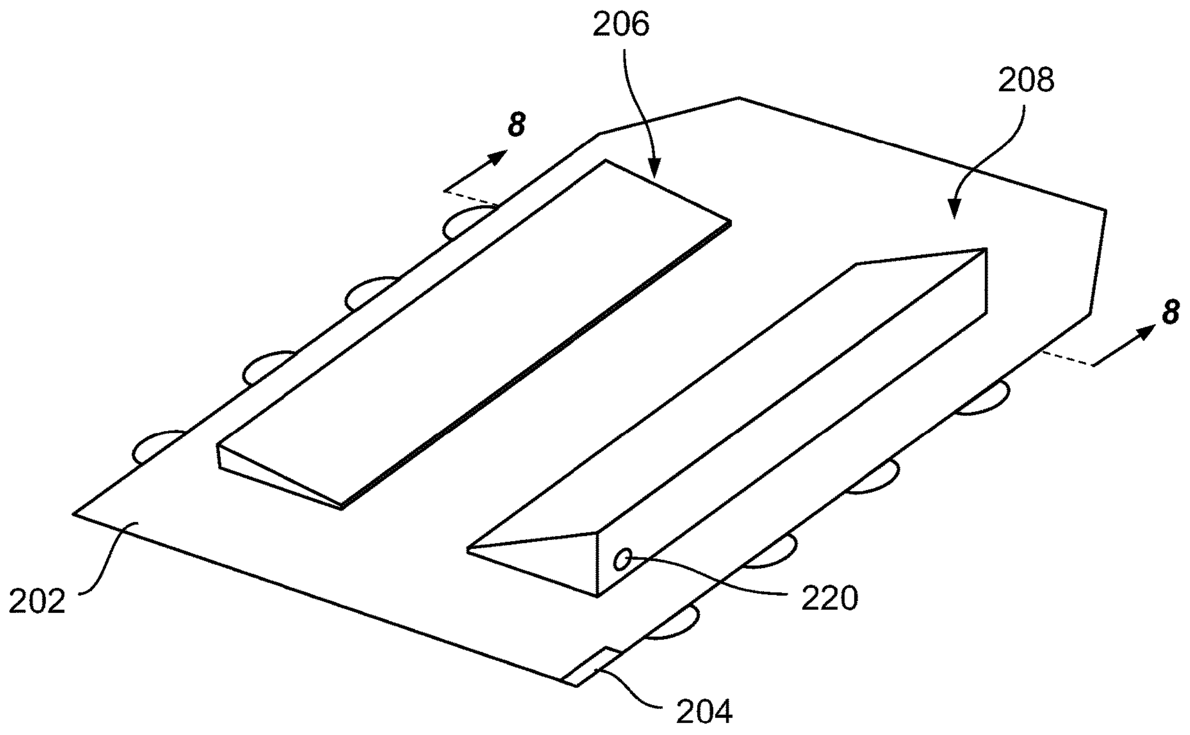
FIG. 7 is a perspective view similar to FIG. 5 showing one of the inflatable wedges in an inflated configuration and the inflatable sheet in the initial, deflated configuration.
Figure 8:
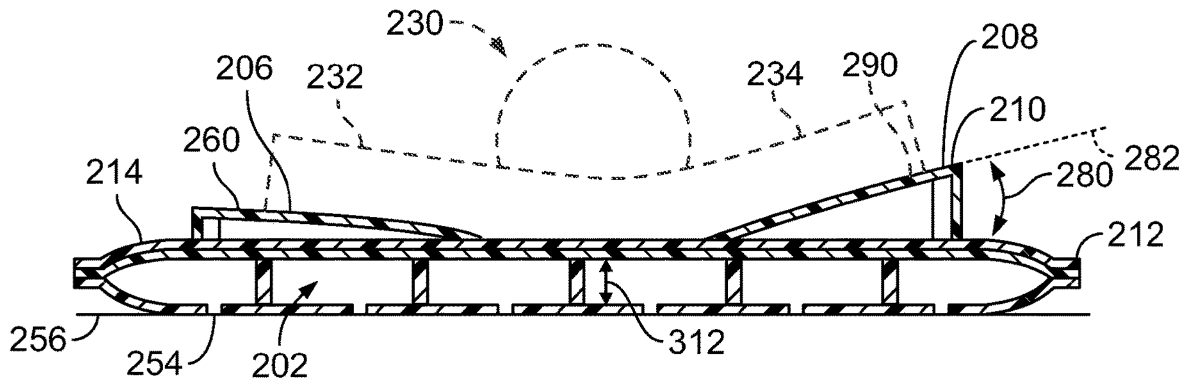
FIG. 8 is a cross-sectional view taken across line 8-8 in FIG. 7 showing a patient having a side elevated by the inflated wedge.

Regarding FIGS. 7 and 8, an air pump has been connected to the wedge air inlet 220 and operated to inflate the inflatable wedge 208 to an inflated configuration. The inflatable sheet 202 remains in the initial, deflated configuration during the wedge inflating process and provides a stable base for the patient 230. By inflating the inflatable wedge 208, the upper wall 210 thereof extends at an angle 280 relative to the upper surface 212 of the cover layer 214 that is larger than angle 262. In one embodiment, the angle 280 is greater than 20 degrees. For example, the angle 280 may be in the range of 20 degrees to approximately 40 degrees, such as approximately 30 degrees. The upper wall 210 may generally form a plane 282 that extends transversely to a plane of the upper surface 260 of the inflatable wedge 206.

Due to the inflation of the inflatable wedge 208, the side 234 of the patient 230 is elevated above the position that is shown in FIG. 6. By elevating the side 234, a portion 290 of the skin of the patient is relieved of pressure. For example, elevating the side 234 may relieve pressure on skin near sacral vertebrae of the patient. The inflation of the inflatable wedge 208 thereby performs patient repositioning without a user having to log roll the patient and position a foam wedge as in some prior approaches. The use of the inflatable wedge 208 to reposition the patient 230 reduces the manual labor involved in repositioning the patient 230.

Once the side 234 of the patient 230 has been elevated for a period of time, such as two hours, the inflatable wedge 208 may be deflated and the patient permitted to lie in the supine position flat on the deflated inflatable patient repositioning sheet 200 for a period of time, such as two hours. Next, the inflatable wedge 206 may be inflated to lift the other side 232 of the patient 230 and relieve pressure on the side 232 of the patient 230. The process of inflating and deflating the inflatable wedges 206, 208 may be performed in any order desired.

Figure 9:
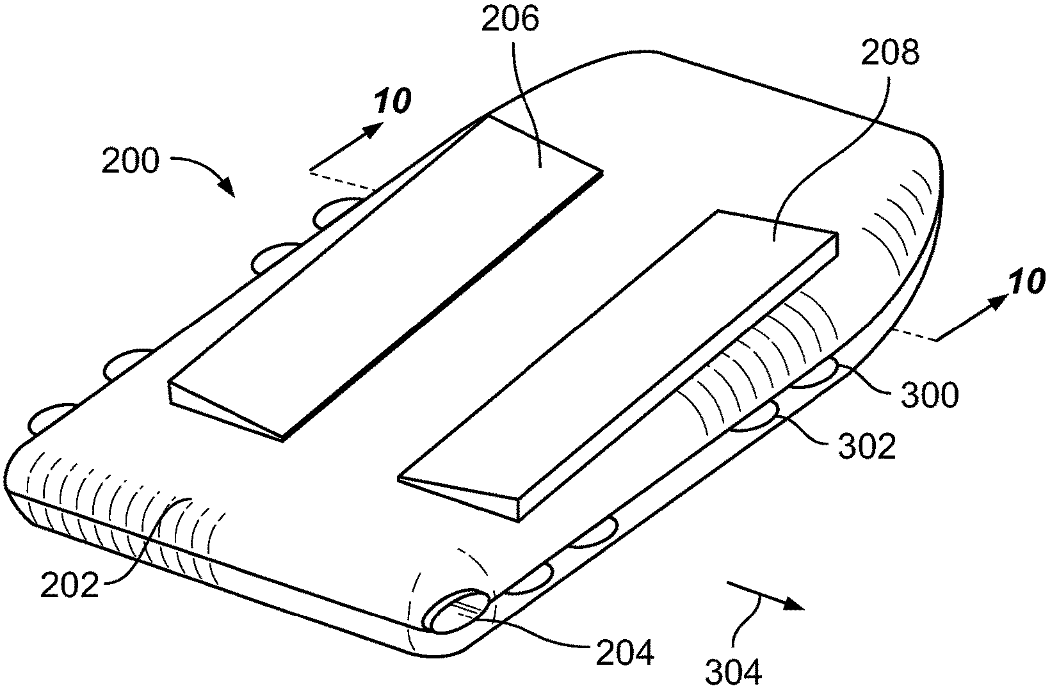
FIG. 9 is a perspective view similar to FIG. 5 showing the inflatable wedges in the initial, deflated configuration and the inflatable sheet in an inflated configuration.
Figure 10:
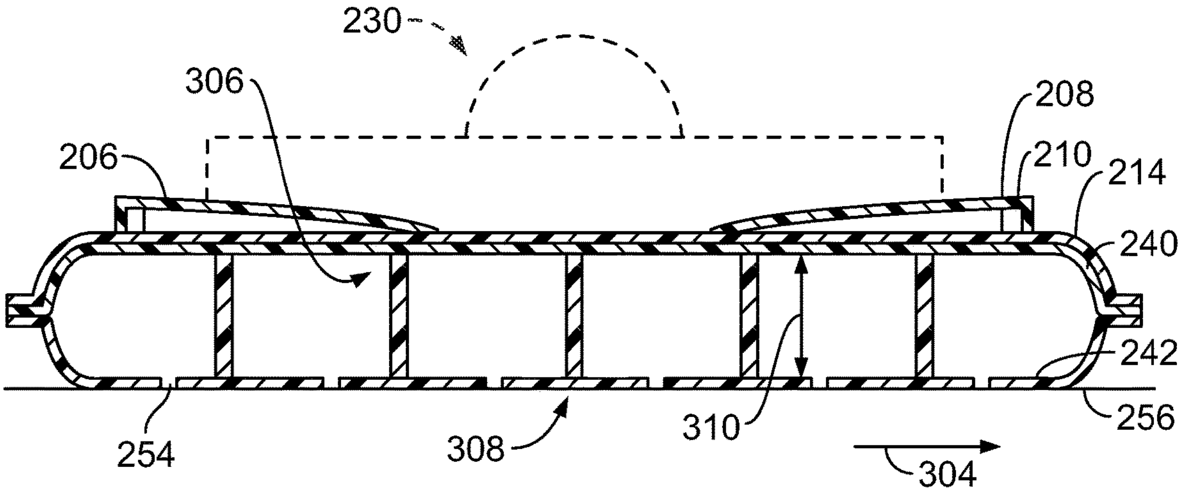
FIG. 10 is a cross-sectional view taken across line 10-10 in FIG. 9 showing longitudinal baffles in the inflated inflatable sheet.

Regarding FIGS. 9 and 10, the inflatable patient repositioning sheet 200 is shown with the inflatable wedges 206, 208 in the initial, deflated configuration and the inflatable sheet 202 in an inflated configuration. The inflatable sheet 202 may be shifted from an initial, deflated configuration of FIG. 5 to the inflated configuration of FIG. 9 via an air pump connected to the air inlet 204. With the inflatable sheet 202 inflated, the inflatable patient repositioning sheet 200 includes one or more handles, such as handles 300, 302 that may be grasped and used to push and/or pull the inflatable patient repositioning sheet 200 and patient 230 thereon, such as in a lateral direction 304.

Regarding FIG. 10, the air provided to the air inlet 204 inflates the inflatable sheet 202 and shifts a center portion 306 of the cover layer 214 and upper layer 240 away from a center portion 308 of the lower layer 242. This creates a distance 310 between the upper layer 240 and a lower layer 242 that is greater than a distance 312 (see FIG. 8) when the inflatable sheet 202 is in the initial, deflated configuration thereof. The larger surface area provided by the inflated inflatable sheet 202 as well as the air traveling through holes 254 in the lower layer 242 reduces the resistance to shifting of the inflatable sheet 202 along the surface 256. The reduced resistance makes it easier for a nurse to shift the inflatable patient repositioning sheet 200 and patient 230 thereon from the surface 256 to another surface.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service. It is intended that the phrase "at least one of" as used herein be interpreted in the disjunctive sense. For example, the phrase "at least one of A and B" is intended to encompass only A, only B, or both A and B.

What is claimed is:

1. A patient repositioning sheet comprising:

an inflatable sheet having a lower layer and an upper layer that are urged apart with inflation of the inflatable sheet;

at least one inflatable support of the inflatable sheet; and a surface portion of the inflatable support that extends obliquely to the upper layer of the inflatable sheet with the inflatable support inflated, the inflatable sheet mounted to a cover layer of the inflatable sheet such that the cover layer extends about the inflatable support and a portion of the cover layer forms a lower portion of the inflatable support, the cover layer made of a high-friction material for engaging a patient and inhibiting movement of the patient relative to the inflatable sheet.

2. The patient repositioning sheet of claim 1 wherein the inflatable support includes an inflatable wedge.

3. The patient repositioning sheet of claim 1 wherein the inflatable support comprises an upper wall including the surface portion, a plurality of side walls, and a plurality of baffles; and wherein the upper wall, side walls, and baffles are joined to the cover layer.

4. The patient repositioning sheet of claim 1 wherein the inflatable support includes an inflatable wedge comprising:

an upper wall including the surface portion;

triangular end walls;

a rectangular side wall; and a plurality of baffles.

5. The patient repositioning sheet of claim 1 wherein the inflatable support is configured to be inflated and deflated independently of the inflatable sheet.

6. The patient repositioning sheet of claim 1 wherein the inflatable support comprises an upper wall including the surface portion, the upper wall including an air-permeable material.

7. The patient repositioning sheet of claim 6 wherein the inflatable support comprises a plurality of side walls connected to the upper wall, the side walls made of a material with an air permeability less than the air permeability of the upper wall.

8. The patient repositioning sheet of claim 1 wherein the inflatable support includes a plurality of walls defining an interior volume of the inflatable support; and wherein the inflatable support includes an air inlet in communication with the interior volume of the inflatable support.

9. The patient repositioning sheet of claim 1 wherein the at least one inflatable support includes a pair of inflatable supports on opposite sides of the inflatable sheet.

10. The patient repositioning sheet of claim 9 wherein the inflatable supports each include an air inlet.

11. The patient repositioning sheet of claim 1 wherein the inflatable support includes a plurality of baffles, a plurality of chambers separated by the baffles, and a side wall;

the baffles having end portions spaced from the side wall by gaps to permit airflow between the chambers.

12. The patient repositioning sheet of claim 1 wherein the surface portion of the inflatable support extends at an angle of approximately thirty degrees relative to an adjacent portion of the upper layer of the inflatable sheet with the inflatable support in an inflated configuration.

13. The patient repositioning sheet of claim 1 wherein the cover layer includes a microfiber material.

14. The patient repositioning sheet of claim 1 wherein the cover layer is laminated to the upper layer of the inflatable sheet.

15. The patient repositioning sheet of claim 1 further comprising an incontinence pad on the cover layer.

16. The patient repositioning sheet of claim 1 wherein the inflatable sheet is mounted to a cover layer of the inflatable sheet such that the cover layer extends about the inflatable support, wherein the inflatable support includes an inflatable wedge and the surface portion includes a wedge surface of the inflatable wedge.

* * * * *